United States Patent
Juchems et al.

(10) Patent No.: US 12,523,186 B2
(45) Date of Patent: Jan. 13, 2026

(54) PRESSURE CONTROL FOR FUEL INJECTORS

(71) Applicant: Caterpillar Inc., Peoria, IL (US)

(72) Inventors: Mitchell B. Juchems, Eureka, IL (US); Kaushik Krishnamurthy, Manteno, IL (US)

(73) Assignee: Caterpillar Inc., Peoria, IL (US)

( * ) Notice: Subject to any disclaimer, the term of this patent is extended or adjusted under 35 U.S.C. 154(b) by 148 days.

(21) Appl. No.: 18/602,478

(22) Filed: Mar. 12, 2024

(65) Prior Publication Data

US 2025/0290462 A1   Sep. 18, 2025

(51) Int. Cl.
 *F02D 41/38* (2006.01)
 *F02D 41/20* (2006.01)
 *F02D 41/22* (2006.01)

(52) U.S. Cl.
 CPC ............ *F02D 41/38* (2013.01); *F02D 41/20* (2013.01); *F02D 41/22* (2013.01); *F02D 2041/224* (2013.01); *F02D 2200/0602* (2013.01); *F02D 2200/0614* (2013.01)

(58) Field of Classification Search
 CPC .......... F02D 41/38; F02D 41/20; F02D 41/22; F02D 2041/224; F02D 2200/0602; F02D 2200/0614
 See application file for complete search history.

(56) References Cited

U.S. PATENT DOCUMENTS

| | | | |
|---|---|---|---|
| 5,986,871 A | 11/1999 | Forck et al. | |
| 7,707,993 B2* | 5/2010 | Coldren | F02M 57/021 123/473 |
| 11,035,316 B1* | 6/2021 | Pursifull | F02M 69/465 |
| 11,230,990 B2 | 1/2022 | Puckett et al. | |
| 11,293,370 B1 | 4/2022 | Puckett et al. | |
| 11,313,338 B1 | 4/2022 | Marrack et al. | |
| 2009/0314259 A1* | 12/2009 | Coldren | F02M 57/021 123/473 |
| 2010/0096473 A1* | 4/2010 | Coldren | F02M 63/0063 239/90 |
| 2018/0328307 A1* | 11/2018 | Kurtz | F02D 41/403 |
| 2022/0082059 A1* | 3/2022 | Pursifull | F02D 41/3863 |
| 2023/0193844 A1 | 6/2023 | Juchems et al. | |

FOREIGN PATENT DOCUMENTS

JP     H11148401 A     6/1999

* cited by examiner

*Primary Examiner* — Sizo B Vilakazi
(74) *Attorney, Agent, or Firm* — Bookoff McAndrews PLLC

(57) ABSTRACT

In one instance, disclosed herein is a method for controlling a fuel injector of an engine system, the method including: applying a first current to a spill valve solenoid to move a spill valve of the fuel injector to a closed spill position; reducing the first current applied to the spill valve solenoid to move the spill valve to an at least partially-open position; determining a dwell duration for the fuel injector based on an expected fuel pressure of the fuel injector; and after the determined dwell duration, increasing the first current applied to the spill valve solenoid to return the spill valve to the closed spill position.

20 Claims, 5 Drawing Sheets

PRESSURE CONTROL FOR FUEL INJECTORS

TECHNICAL FIELD

The present disclosure relates generally to internal combustion engines, and more particularly, to methods and systems for controlling the pressure of a fuel injector.

BACKGROUND

An internal combustion engine often includes an electronic controller that governs and/or monitors various aspects of the operation of the internal combustion engine. For example, in order to accurately control the timing and/or quantity of fuel injected into the internal combustion engine by a fuel injector included in the internal combustion engine, an internal combustion engine system may include a controller that governs and/or monitors the position of one or more electronically-controlled valves (e.g., solenoid valves) housed within the fuel injector. For efficiency, safety, or regulatory purposes, it may also be desirable to inject small amounts of fuel in closely-timed injections or employ other injection strategies in which multiple injections occur in quick succession. Closely-timed injections can cause pulses in fuel, making control over the pressure at which the fuel is injected into the internal combustion engine by the fuel injector beneficial. Control over this pressure is challenging, for example because the pressure at which fuel is injected into an internal combustion engine by a fuel injector may vary on an injector-to-injector basis.

A method for controlling a fuel injector having a spill valve that includes monitoring injection times and correcting actuation timing of the spill valve is disclosed in JPH11-148401A (the '401 application) to Kuwabara et al. The control device described in the '401 application measures and calculates deviations between expected injection times and real injection times and corrects the actuation timing of the spill valve based on these deviations. However, the '401 application does not disclose any method or system for mapping or controlling the pressure of a fuel injector.

The methods and systems of the present disclosure may solve one or more of the problems set forth above and/or other problems in the art. The scope of the protection provided by the present disclosure, however, is defined by the attached claims, and not by the ability to solve any specific problem.

SUMMARY

In one aspect, a method for controlling a fuel injector of an engine system may include: applying a first current to a spill valve solenoid to move a spill valve of the fuel injector to a closed spill position; reducing the first current applied to the spill valve solenoid to move the spill valve to an at least partially-open position; determining a dwell duration for the fuel injector based on an expected fuel pressure of the fuel injector; and after the determined dwell duration, increasing the first current applied to the spill valve solenoid to return the spill valve to the closed spill position.

In another aspect, a method for generating at least one pressure-dwell relationship map for a fuel injector may include: performing a series of tests on the fuel injector, wherein each test of the series of tests includes: applying a first current to a spill valve solenoid to move a spill valve of the fuel injector to a closed position; reducing the first current applied to the spill valve solenoid to move the spill valve to a partially-open position for a dwell duration; and measuring at least one fuel pressure of the fuel injector after expiration of the dwell duration; and generating, based on the series of tests performed on the fuel injector, at least one pressure-dwell relationship map for the fuel injector.

In another aspect, an engine system may include at least one fuel injector and a controller operative to: apply a first current to a valve solenoid to move a valve of the fuel injector to a fully closed position; reduce the first current applied to the valve solenoid to move the valve to a partially-open position; determine a dwell duration for the valve of the fuel injector based on at least one expected fuel pressure of the fuel injector; and after determining the dwell duration, increase the first current applied to the valve solenoid to return the valve to the fully closed position.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value. In this disclosure, the term "based on," or any other variation thereof, is intended to cover, for example, "partially based on", "at least partially based on", and "based entirely on".

Figure 1:
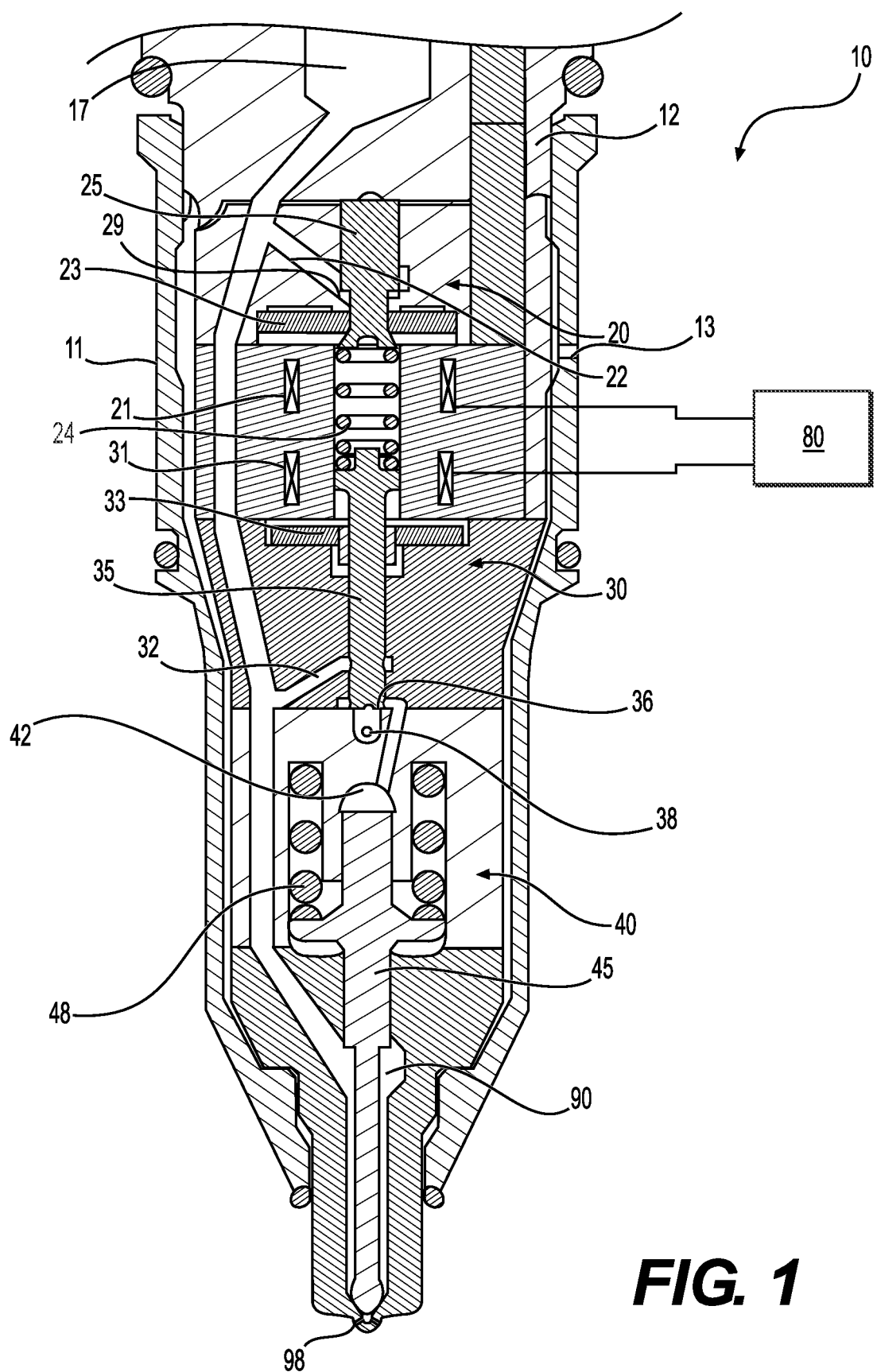
FIG. 1 depicts a schematic, cross-sectional view of a fuel injector.

FIG. 1 illustrates a schematic, cross-sectional view of a fuel injector 12. Fuel injector 12 may be a component of a fuel injection system 10, which may further include one or more power sources (e.g., one or more batteries, one or more high-voltage power systems; not shown) and one or more controllers (e.g., electronic control module or ECM 80). Fuel injection system 10 may be a component of an engine system (e.g., an internal combustion engine or ICE). The one or more controllers 80 of fuel injection system 10 may be operative to cause the one or more power sources to provide electrical energy to one or more components of fuel injector 12, such as one or more solenoid valves. The components of fuel injector 12 may be operative to cause fuel injector 12 to inject fuel into another component of an engine system in which fuel injector 12 is connected, such as a combustion chamber (not shown).

Fuel injector 12 may be a mechanically-actuated, electronically-controlled fuel injector in which fuel is pressurized by a cam (not shown) and injected based on signals generated with ECM 80. As illustrated in FIG. 1, fuel injector 12 may include an injector body 11. Injector body 11 may house various components of fuel injector 12, such as a fuel reservoir 17, one or more valves (e.g., electronically-controlled solenoid valves) such as a spill valve 20 and a control valve 30, and a series of passages for supplying, returning, and injecting fuel. Fuel reservoir 17 may be receive fuel from a fuel source (not shown) and may be pressurized, such as by a cam-actuated piston (not shown), to provide pressurized fuel to a check valve 40. The operation of check valve 40 may be governed by spill valve 20 and control valve 30.

Spill valve 20 may be a normally-open valve that includes a spill valve solenoid 21, a spill valve armature 23, a spill valve member 25, and a spill valve seat 29. When spill valve 20 is at rest (e.g., when spill valve 20 is not actuated by electrical energy), spill valve 20 is in a fully-open position, as illustrated in FIG. 1. In the fully-open position, spill valve member 25 may be positioned away from spill valve seat 29, permitting communication between a spill passage 22 and a fuel return passage 13. In such a configuration, fuel is allowed to drain from fuel injector 12, thereby reducing the pressure within fuel injector 12 (e.g., the pressure within fuel reservoir 17). Spill valve 20 may be biased toward the fully-open position by a spring 24.

When spill valve 20 is fully actuated (e.g., by electrical energy), spill valve 20 is in a closed position. In the closed position, spill valve member 25 may engage with spill valve seat 29, preventing communication between spill passage 22 and fuel return passage 13. In such a configuration, fuel is not allowed to drain from fuel injector 12, causing the pressure within fuel injector 12 (e.g., the pressure within fuel reservoir 17) to increase. In some instances, fuel is not released by fuel injector 12 until spill valve 20 has been actuated into the closed position and the pressure within fuel injector 12 has been increased accordingly. Thus, the actuated or closed position of spill valve 20 may be associated with the injection of fuel. When spill valve 20 is not at rest but not fully actuated, spill valve 20 may be in an intermediate or partially-open position. While spill valve 20 is in a partially-open position, fuel may be allowed to drain from fuel injector 12 at a slower rate than fuel is allowed to drain from fuel injector 12 when spill valve 20 is in the fully-open position.

Control valve 30 may include a control valve solenoid 31, a control valve armature 33, a control valve member 35, and a control valve seat 36. When control valve 30 is at rest (e.g., when control valve 30 is not actuated by electrical energy), control valve 30 is in a non-injection position, as illustrated in FIG. 1. In the non-injection position, control valve member 35 may be positioned so as to permit communication between a control chamber 42 and a high-pressure connection passage 32, as illustrated in FIG. 1. In such a configuration, control valve member 35 may engage with control valve seat 36 and prevent communication between control chamber 42 and a low-pressure connection passage 38, placing control chamber 42 in a pressurized condition that prevents motion of check valve member 45. Control valve 30 may be biased toward the non-injection control position by spring 24.

When control valve 30 is fully actuated (e.g., by electrical energy), control valve 30 is in an injection position. In the injection position, control valve member 35 may prevent communication between control chamber 42 and high-pressure connection passage 32, and may permit communication between control chamber 42 and low-pressure connection passage 38, thereby decreasing pressure in control chamber 42. The decreased pressure in control chamber 42 allows check valve member 45 to move, and ultimately allows fuel injector 12 to release fuel.

Check valve 40 may be a one-way valve including a check valve member 45 that, when in a closed check position as illustrated in FIG. 1, prevents communication between a check valve chamber 90 and injection orifices 98. When in an open position, communication may be permitted between check valve chamber 90 and injection orifices 98, allowing fuel to be released. A spring 48 may bias check valve member 45 toward the closed check position. Additionally, check valve member 45 may be held in the closed check position when control chamber 42 is in communication with high-pressure connection passage 32 (e.g., when control valve 30 is in the closed control position, as described above). Needle valve member 45 may be configured to move from this closed check position to an open check position when control valve 30 is in the actuated or open control position. For example, when spill valve 20 is in the closed spill position and control valve 30 is in the open control position, control chamber 42 may be at a lower pressure compared to pressure within check valve chamber 90, thereby allowing pressurized fuel in check valve chamber 90 to act against a biasing force of spring 48, lift check valve member 45, and release fuel through orifices 98.

Figure 6:
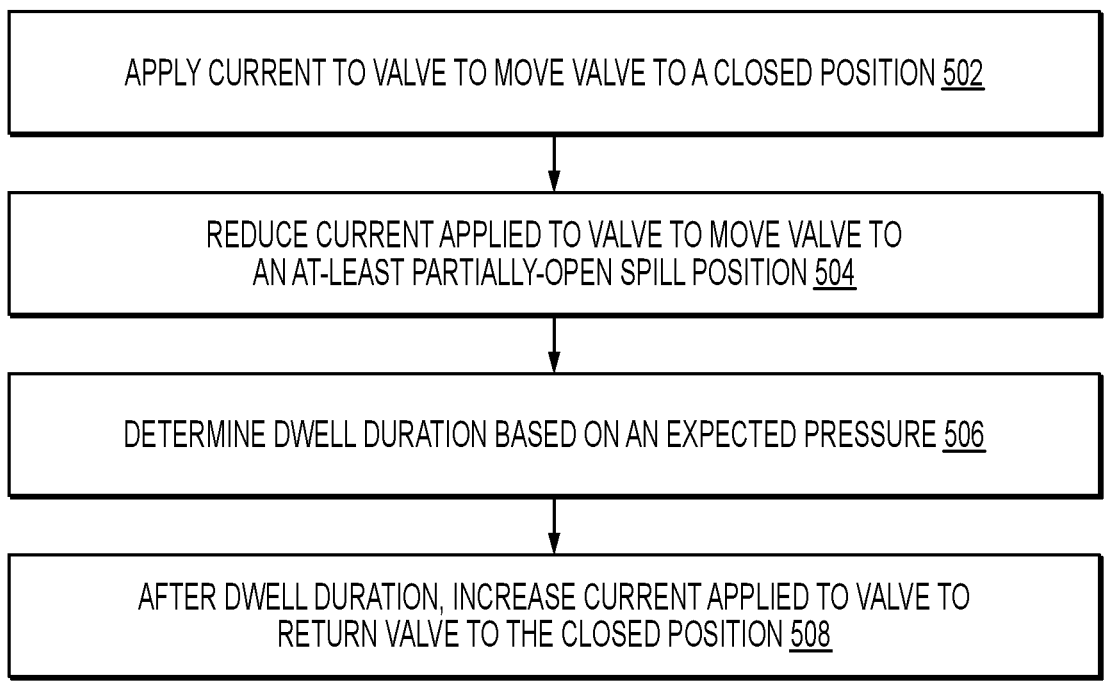
FIG. 6 depicts a flowchart of a method for controlling a fuel injector.

ECM 80 may be configured to receive sensed inputs and generate commands or other signals to monitor or control the operation of a plurality of fuel injectors 12 of fuel injection system 10. ECM 80 may include a single microprocessor or multiple microprocessors that receive inputs and issue control signals, including the application of electrical energy to solenoids 21 and 31. ECM 80 may be configured to control the application of electrical energy, and therefore current, applied to solenoids 21 and 31. For example, ECM 80 may issue commands to selectively energize (e.g., increasing a current applied to) solenoids 21 and 31 with electrical power and may control circuitry configured to de-energize (e.g., reduce a current applied to) solenoids 21 and 31 and/or control a rate of decay of electrical energy stored by solenoids 21 and 31. ECM 80 may include a memory, a secondary storage device, a processor, such as a central processing unit, or any other means for accomplishing a task consistent with the present disclosure. The memory or secondary storage device associated with ECM 80 may store data and software to allow ECM 80 to perform its functions, including the functions described below with respect to method 500 (FIG. 6). In particular, data and software in memory or secondary storage device(s) may allow ECM 80 to perform any of the valve return timing, signal analyses, and adaptive injector control functions described herein. Numerous commercially available microprocessors can be configured to perform the functions of ECM 80. Various other known circuits may be associated with ECM 80, including signal-conditioning circuitry, communication circuitry, and other appropriate circuitry.

Figure 2:
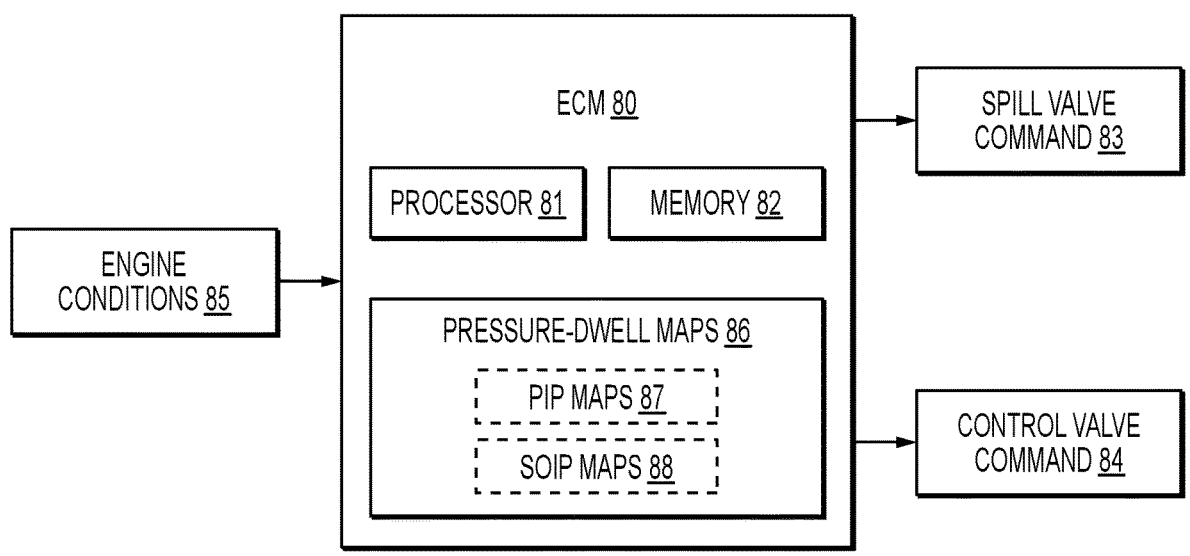
FIG. 2 depicts a block diagram of an exemplary electronic control module.

FIG. 2 depicts a block diagram of an exemplary electronic control module (ECM) 80. As mentioned above, ECM 80 may include a processor 81, a memory 82, or any other means for accomplishing a task consistent with the present disclosure. As mentioned above, ECM 80 may be operative to generate and output commands for controlling a fuel injector 12, such as a spill valve command 83 for controlling electrical energy applied to a spill valve 20 (e.g., a spill valve solenoid 21) or a control valve command 84 for controlling electrical energy applied to a control valve 30 (e.g., a control valve solenoid 31). Spill valve command 83 and control valve command 84 may be generated or output by the ECM 80 in the form of signals or waveforms that correspond to instructions for applying or providing electrical energy to spill valve 20 or control valve 30, respectively. ECM 80 may generate and output commands for controlling a fuel injector 12 based on or in response to engine conditions 85. Engine conditions 85 may correspond to one or more signals indicative of engine parameters such as engine speed, requested engine output, or any other input with which ECM 80 may determine various factors associated with the injection of fuel. Engine conditions 85 may include one or more sensed conditions (e.g., engine speed) and one or more conditions calculated by ECM 80 or another control unit (e.g., a desired quantity of fuel injection).

ECM 80 may be operative to generate a spill valve command 83 or a control valve command 84 based at least in part on one or more pressure-dwell relationship maps 86. As mentioned above, it may be desirable to control the pressure at which fuel is released by a fuel injector 12. As described in further detail below, ECM 80 may be operative to control the pressure at which fuel is released by a fuel injector 12 using one or more pressure-dwell relationship maps 86. A pressure-dwell relationship map 86 may represent a relationship between the pressure of a fuel injector 12 (e.g., after a spill valve 20 of the fuel injector 12 has been moved to a closed spill position) and an amount of time. This amount of time may represent time that elapses between 1) initially reducing (e.g., drawing down) the electrical energy applied to a spill valve 20 to move the spill valve 20 to a partially-open position and 2) initially increasing the electrical energy applied to the spill valve 20 to return the spill valve 20 to the closed position (also referred to as a start of current or "SOC"). This amount of time between 1) and 2), as described above, may be referred to as a dwell duration. In general, longer dwell durations may be associated with lower pressure of the injector 12. This is because, in general, the longer the dwell duration, the less time the spill valve 20 remains in a fully-closed position in which pressure within the fuel injector 12 increases at a maximum rate, as described in further detail below.

A pressure-dwell relationship map 86 may be any type of relationship, such as a mathematical relationship or a set of data points (e.g., a look-up table). A pressure-dwell relationship map 86 may represent the relationship between dwell duration and any pressure related to the fuel injector 12. For example, a pressure-dwell relationship map 86 may include a peak injection pressure (PIP) map 87, representing the relationship between dwell duration and the peak pressure within by the fuel injector 12 during an injection event (as described below). Additionally or alternatively, pressure-dwell relationship map 86 may include a start-of-injection pressure (SOIP) map 88, representing the relationship between dwell duration and the pressure within the fuel injector 12 at the moment in which the fuel injector 12 first begins to release fuel during an injection event. A pressure-dwell relationship map 86 may be specific to an individual or particular fuel injector 12 and/or may be generated based on tests (e.g., a series of end-of-line (EOL) tests) performed on an individual or particular fuel injector 12, as described below. The ECM 80 may store or otherwise have access to a plurality of different pressure-dwell relationship maps 86 generated for a plurality of fuel injectors 12 included in the same engine system.

INDUSTRIAL APPLICABILITY

Fuel injection system 10 may be used in conjunction with any appropriate machine, vehicle, or other device or system that includes an engine system (e.g., an internal combustion engine) having one or more fuel injectors 12 with electronically-controlled valves. In particular, fuel injection system 10 may be used in any internal combustion engine in which it is desirable to control the pressure of fuel within the fuel injector 12 and/or to control the pressure at which fuel is released by a fuel injector 12. The pressure at which fuel is released by a fuel injector 12 may be referred to as injection pressure. In general, higher injection pressure increases the efficiency of an engine system and decreases harmful or otherwise undesired emissions from the engine system; however, if injection pressure is too high, the engine system may experience wear or even be damaged.

In a single-shot injection mode, the spill valve 20 of a fuel injector 12 begins at rest in a fully-open position (as described above), and the control valve 30 of the fuel injector 12 begins at rest in a non-injection position (as described above). Electrical energy is then applied to a spill valve solenoid 21 of the spill valve 20 to move the spill valve 20 to an actuated or closed position. While the spill valve 20 is in the actuated or closed position, the pressure within the fuel injector 12 increases (as described above). Electrical energy is also applied to a control valve solenoid 31 of the control valve 30 to move the control valve 30 to an actuated or injection position (as described above), allowing pressurized fuel within the fuel injector 12 to be released in a shot of fuel from the fuel injector 12. The electrical energy applied to both the spill valve solenoid 21 and the control valve solenoid 31 is then reduced to allow the respective valves to return to their respective rest positions.

Figure 3:
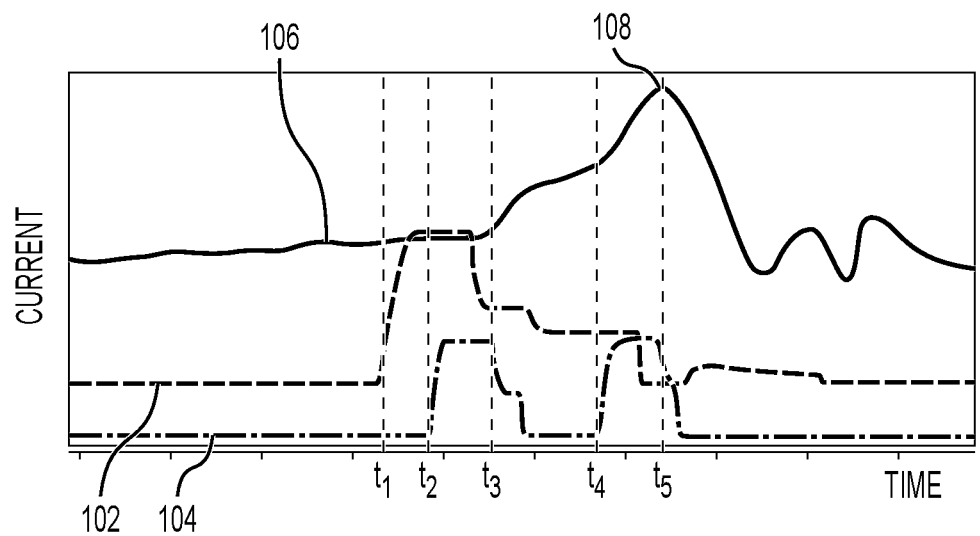
FIG. 3 depicts a chart representing an exemplary operation of a fuel injector.
Figure 4:
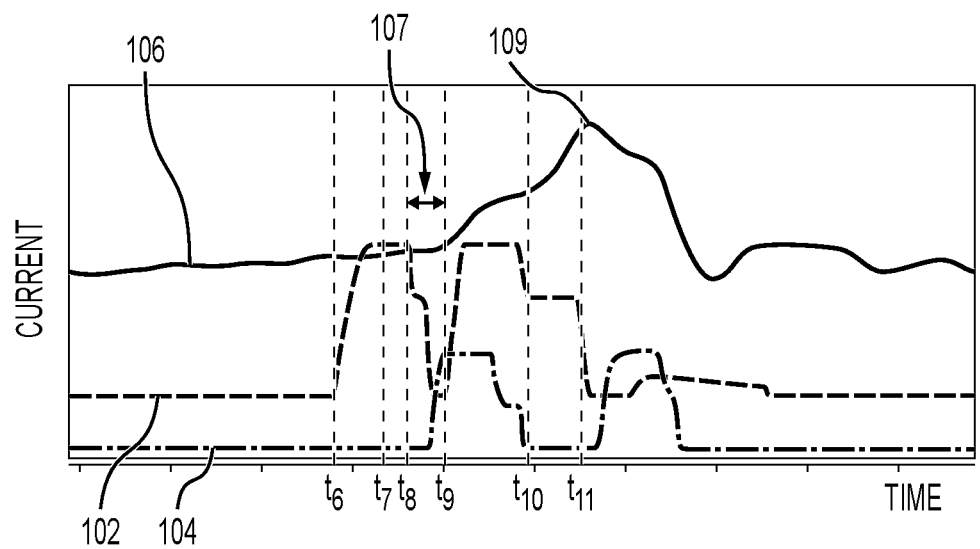
FIG. 4 depicts a chart representing an exemplary operation of a fuel injector.

FIGS. 3 and 4 are charts depicting exemplary operations of a fuel injector 12 during a multi-shot injection mode. In FIGS. 3 and 4, electrical energy 102 applied to a spill valve solenoid 21 of a fuel injector 12, electrical energy 104 applied to a control valve solenoid 31 of the fuel injector 12, and a pressure 106 of the fuel injector 12 (e.g., injection pressure) are plotted with respect to time. In the examples of both FIG. 3 and FIG. 4, the fuel injector 12 is operated according to a close-coupled or multi-shot injection mode, wherein fuel is released from the fuel injector 12 multiple times (e.g., twice) in short succession before a spill valve 20 of the fuel injector 12 is allowed to return to a resting, fully-open position.

For example, in FIG. 3, the electrical energy 102 applied to the spill valve solenoid 21 of the fuel injector 12 is increased at a time $t_1$ to move the spill valve 20 of the fuel injector 12 to a closed spill position. The electrical energy 102 applied to the spill valve solenoid 21 is not reduced to its original level, at which the spill valve 20 would be allowed to return to its resting, fully-open position, until time $t_5$. Between times $t_1$ and $t_5$, the electrical energy 104 applied to the control valve solenoid 31 of the fuel injector 12 is increased at a time $t_2$ to move the control valve 30 of the fuel injector 12 to an injection position, reduced at time $t_3$ to allow the control valve 30 to return to its resting, non-injection position, and increased again at time $t_4$ to move the control valve 30 back to the injection position. In this example, each time the electrical energy 104 applied to the control valve solenoid 31 is increased, at times closely following times $t_2$ and $t_4$, fuel is released from the fuel injector 12, resulting in what may be referred to as a first shot of fuel released from the fuel injector 12 beginning at time $t_2$ and a second shot of fuel released from the fuel injector 12 beginning at time $t_4$. Thus, in this example, fuel is released from the fuel injector 12 multiple times (e.g., twice) before the spill valve 20 is allowed to return to its resting, fully-open spill position.

In FIG. 4, the electrical energy 102 applied to the spill valve solenoid 21 of the fuel injector 12 is increased at time $t_6$ to move the spill valve 20 of the fuel injector 12 to a closed position. The electrical energy 102 applied to the spill valve solenoid 21 is not reduced to its original level, at which the spill valve 20 would be allowed to return to its resting, fully-open position, until time $t_{11}$. Between times $t_6$ and $t_{11}$, the electrical energy 104 applied to the control valve solenoid 31 of the fuel injector 12 is increased at time $t_7$ to move the control valve 30 of the fuel injector 12 to the injection position, reduced to allow the control valve 30 to return to its resting, non-injection position (time not labeled), and increased again at time $t_{10}$ to move the control valve 30 back to the injection position. Accordingly, fuel is released from the fuel injector 12 in a first shot beginning at or closely after time $t_7$ and a second shot beginning at or closely after time $t_{10}$. Thus, in this example, fuel is released from the fuel injector 12 multiple times (e.g., twice) before the spill valve 20 is allowed to return to its resting, fully-open spill position.

In FIG. 3, between times $t_1$ and $t_5$, enough electrical energy 102 is applied to the spill valve solenoid 21 to move the spill valve 20 to the closed position and keep the spill valve 20 in the closed position until multiple shots of fuel have been released by the fuel injector 12. Because the spill valve 20 is not allowed to begin to return to the fully-open position between the multiple shots of fuel released by the fuel injector 12, the pressure 106 of the fuel injector 12 continues to increase in until at least time $t_5$, and may reach an undesired level that exceeds a maximum desired fuel pressure.

As depicted in FIG. 4, to control and reduce the pressure 106 of the fuel injector 12, the electrical energy 102 applied to the spill valve solenoid 21 may be reduced between the multiple shots of fuel released by the fuel injector 12 (e.g., at time $t_8$) to move the spill valve 20, or to allow the spill valve 20 to move, to an intermediate or partially-open spill position. As described above, in a partially-open spill position, the spill valve 20 is not at rest but not fully actuated, and fuel may be allowed to drain from the fuel injector 12, but at a slower rate than fuel is allowed to drain from the fuel injector 12 when the spill valve 20 is in a fully-open position. In some instances, to move the spill valve 20, or to allow the spill valve 20 to move, to an intermediate or partially-open position, the electrical energy 102 applied to the spill valve solenoid 21 may be reduced by drawing down the electrical energy 102 (e.g., via circuitry configured to reduce the electrical energy) or by removing a portion of the electrical energy 102 being applied to the spill valve solenoid 21 from a power source (e.g., a battery), such that the electrical energy 102 applied to the spill valve solenoid 21 is allowed to freewheel as the spill valve 20 moves toward its resting, fully-open position. However, electrically energy 102 applied to the spill valve solenoid 21 may be reduced in any other appropriate way. While the spill valve 20 is in a partially-open position, the pressure 106 of the fuel injector 12 decreases, remains approximately constant, or increases at a rate slower than the pressure 106 of the fuel injector 12 would increase if the spill valve 20 was in the closed spill position. Thus, the maximum pressure 109 reached by the fuel injector 12 in the example depicted by FIG. 4 is less than the maximum pressure 108 reached by the fuel injector 12 in the example depicted by FIG. 3.

The difference between the maximum pressure 108 reached by the fuel injector 12 in the example depicted in FIG. 3, when the spill valve 20 is kept in the closed position between the multiple shots of fuel released by the fuel injector 12, and the maximum pressure 109 reached by the fuel injector 12 in the example depicted by FIG. 4, when the spill valve 20 moves to an intermediate or partially-open position between the multiple shots of fuel released by the fuel injector 12, may be controlled or determined by the amount of time in which the spill valve 20 is in a partially-open position. The amount of time in which the spill valve 20 is in a partially-open position may be controlled by the amount of time that elapses between 1) the electrical energy 102 applied to the spill valve solenoid 21 of the fuel injector 12 being reduced to move the spill valve 20 of the fuel injector 12 to a partially-open position and 2) the electrical energy 102 applied to the spill valve solenoid 21 of the fuel injector 12 being increased to return the spill valve 20 back to the closed position (e.g., the amount of time elapsed between time $t_8$ and time $t_9$), which may be referred to as a dwell duration 107.

In general, the longer the dwell duration 107, the lower the maximum pressure 108 reached by the fuel injector 12 will be. Further, it may be beneficial to optimize the pressure 106 of the fuel injector 12 (e.g., the injection pressure) by maximizing the pressure 106 of the fuel injector 12 without exceeding a certain pressure limit. Because the dwell duration 107 can influence the pressure 106, and because the dwell duration 107 can be controlled by increasing or decreasing the time elapsed between 1) reducing the electrical energy 102 applied to the spill valve solenoid 21 to move the spill valve 20 from the closed position to a partially-open position and 2) increasing the electrical energy 102 applied to the spill valve solenoid 21 to move the spill valve 20 back to the closed position (as described above), the dwell duration 107 can be used to optimize the pressure 106 of the fuel injector 12. It will be understood that although dwell durations 107 are described herein as an amount of time that elapses between 1) reducing electrical energy 102 applied to a spill valve solenoid 21 of a fuel injector 12 to move or allow a spill valve 20 of the fuel injector 12 to a partially-open position and 2) increasing the electrical energy 102 applied to the spill valve solenoid 21 of the fuel injector 12 to return the spill valve 20 of the fuel injector 12 to a closed position, in some instances, a spill valve 20 of a fuel injector 12 may be moved or allowed to move to a fully-open position during a portion of dwell duration 107.

To use a dwell duration 107 to optimize the pressure 106 of a fuel injector 12, a relationship between the dwell duration 107 and the pressure 106 of the fuel injector 12 may be determined. As mentioned above, a relationship between the dwell duration 107 and the pressure 106 of a fuel injector 12 may be referred to as a pressure-dwell relationship map 86. In some instances, a pressure-dwell relationship map 86 may be generated by performing a series of end-of-line (EOL) tests on the fuel injector 12. An EOL test may be a quantitative or qualitative control task executed at the end of a production line. For example, before a fuel injector 12 is allowed to be sold to a consumer, a producer of the fuel injector 12 may perform one or more EOL tests on the fuel injector 12 to ensure that the fuel injector 12 can withstand a certain amount (e.g., a commercial grade) of heat, cold, or pressure. Any number of EOL tests may be performed on a fuel injector 12 to test the fuel injector 12 for any number of qualitative or quantitative metrics or factors.

Figure 5:
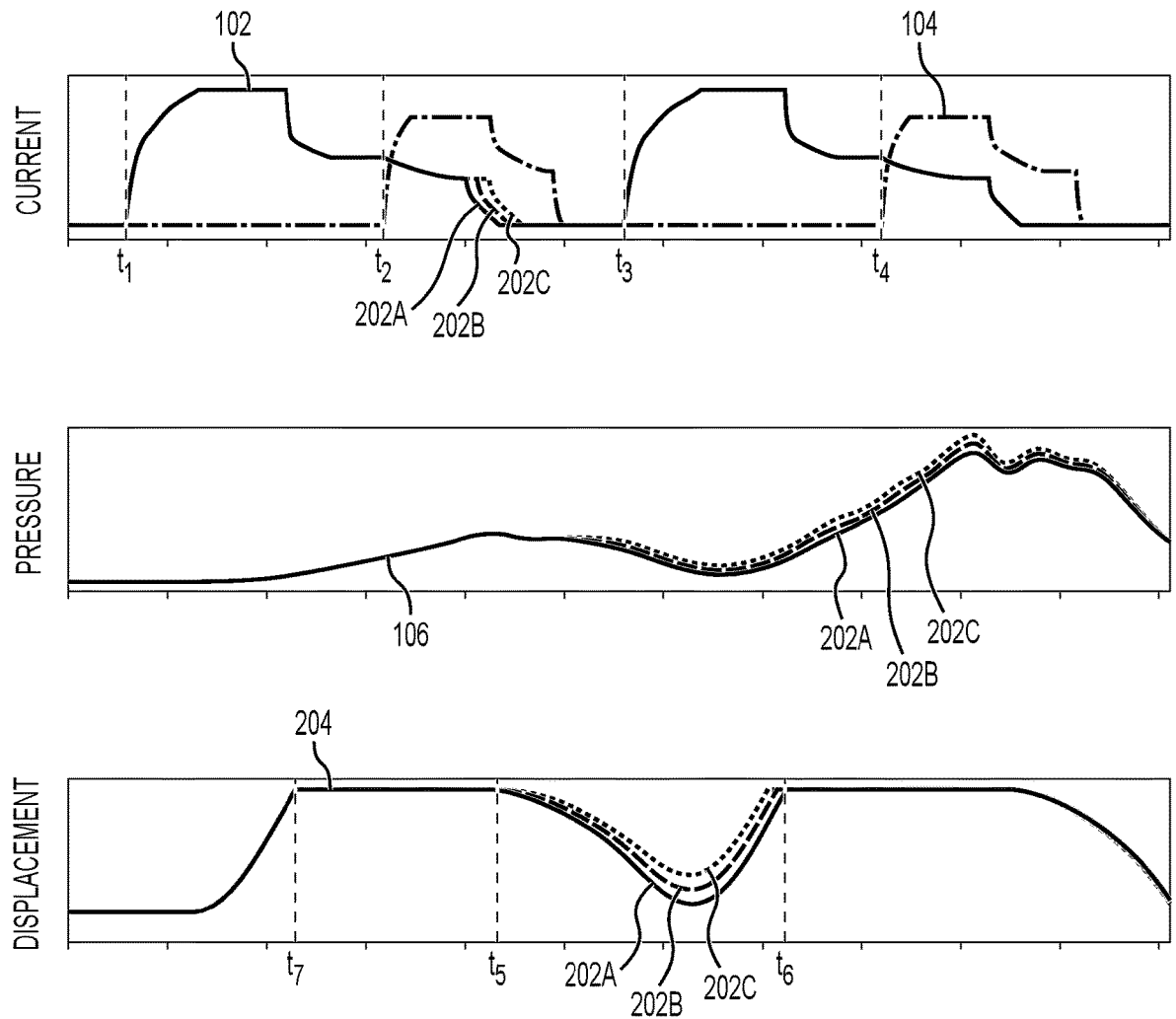
FIG. 5 depicts a chart representing exemplary end-of-line tests performed on a fuel injector.

FIG. 5 depicts an exemplary series of tests (e.g., EOL tests) that may be used to generate a pressure-dwell relationship map 86 for a fuel injector 12. Waveforms representing three tests 202A-202C are depicted in FIG. 5. For each of the three tests 202A-202C, the electrical energy 102 (e.g., current) applied to the spill valve solenoid 21 of the fuel injector 12, the electrical energy 104 (e.g., current) applied to the control valve solenoid 31 of the fuel injector 12, and pressure 106 of fuel (e.g., within the fuel injector 12), and the displacement 204 of the spill valve member 25 are plotted with respect to time.

In each of the three tests 202A-202C, the electrical energy 102 applied to the spill valve solenoid 21 of the fuel injector 12 is first increased at time $t_1$ to move the spill valve 20 of the fuel injector 12 to a closed position and again at time $t_3$. Similarly, for each of the three tests 202A-202C, the electrical energy 104 applied to the control valve solenoid 31 of the fuel injector 12 is first increased at time $t_2$ to release a first shot of fuel from the fuel injector 12 and again at time $t_4$ to release a second shot of fuel from the fuel injector 12. However, each test 202A-202C reduces the electrical energy 102 applied to the spill valve solenoid 21 of the fuel injector 12 to move the spill valve 20 of the fuel injector 12 to a partially-open position at a different time, and thus each test has a different dwell duration 107. For example, the electrical energy 102 applied to the spill valve solenoid 21 of the fuel injector 12 is reduced to move the spill valve 20 of the fuel injector 12 to a partially-open position earlier in test 202A than it is in tests 202B and 202C; accordingly, test 202A has the longest dwell duration 107 of the three EOL tests. Similarly, test 202B begins reducing the electrical energy 102 applied to the spill valve solenoid 21 of the fuel injector 12 to move the spill valve 20 of the fuel injector 12 to a partially-open position later than in test 202A but earlier than in test 202C and therefore has a dwell duration 107 shorter than that of test 202A but longer than that of test 202C. Test 202C begins reducing the electrical energy 102 applied to the spill valve solenoid 21 of the fuel injector 12 to move the spill valve 20 of the fuel injector 12 to a partially-open position later than in both tests 202A and 202B and therefore has the shortest dwell duration 107 of the three tests. Accordingly, the maximum pressure of the fuel injector 12 is greatest for test 202C, least for test 202A, and in between that of tests 202A and 202C for test 202B.

In the examples depicted in FIG. 5, the spill valve 20 of the fuel injector 12 begins each of the waveforms at a resting, fully-open position, as indicated by the displacement 204 of the spill valve member 25 being zero. When electrical energy 102 is applied to the spill valve solenoid 21 of the fuel injector 12 to move the spill valve 20 to a closed position (e.g., a time $t_1$), the spill valve member 25 moves toward the closed position, reaching the closed position when the displacement 204 of the spill valve member 25 plateaus.

In the examples depicted in FIG. 5, when the electrical energy 102 applied to the spill valve solenoid 21 of the fuel injector 12 is reduced to move the spill valve 20 of the fuel injector 12 to a partially-open position, the portion of the electrical energy 102 applied to the spill valve solenoid 21 by a power source (e.g., a battery) is drawn down or removed, allowing the spill valve 20 to move toward its resting, fully-open position. As depicted in FIG. 5, as the spill valve 20 moves toward a fully-open position, the displacement 204 of the spill valve member 25 decreases.

However, as depicted in FIG. 5 and as mentioned above, the spill valve 20 is not allowed to return to the fully-open position between the two shots of fuel released by the fuel injector 12 (e.g., between times $t_2$ and $t_4$). During this period, while the displacement 204 of the spill valve member 25 is between its maximum and its minimum (e.g., between times $t_5$ and $t_6$), the spill valve 20 is considered to be in a partially-open position.

As depicted in FIG. 5, because the dwell duration 107 of test 202A is the longest, while the spill valve 20 is in a partially-open position, the displacement 204 of the spill valve member 25 comes closer to its minimum than it does in tests 202B and 202C; because the dwell duration 107 of test 202C is the shortest, while the spill valve 20 is in a partially-open position, the displacement 204 of the spill valve member 25 remains further from its minimum than it does in tests 202A and 202B; and because the dwell duration 107 of test 202B is shorter than that of test 202A and longer than that of test 202C, while the spill valve 20 is in a partially-open position, the displacement 204 of the spill valve member 25 comes closer to its minimum than it does in waveform 202C but remains further from its minimum than it does in waveform 202A.

For each of tests 202A-202C represented in FIG. 5, a different dwell duration 107 is tested, and a pressure of the fuel injector 12 is determined for the particular dwell duration 107, producing a pressure-dwell data point for the fuel injector 12. In this way, through a series of tests performed on the fuel injector 12, a pressure-dwell relationship map 86 may be generated, representing an expected pressure of the fuel injector 12 for any given dwell duration 107. The expected pressure may be any pressure related to the fuel injector 12, such as a peak injection pressure or a start-of-injection pressure. In some instances, the tests performed on a fuel injector 12 to produce pressure-dwell data points for the fuel injector 12 may be end-of-line (EOL) tests. In some instances, the tests performed on a fuel injector 12 to produce pressure-dwell data points for the fuel injector 12 may be performed (e.g., by an ECM 80) during commercial operation of the fuel injector 12 (e.g., at startup, shutdown, or steady-state operation of an engine system that includes the fuel injector 12).

The pressure-dwell relationship map 86 generated for the fuel injector 12 may be provided to an ECM 80 that will govern the operation of the fuel injector 12 for an engine system that the fuel injector 12 is included in. Then, given a pressure limit for the engine system, the ECM 80 can use the pressure-dwell relationship map 86 generated for the fuel injector 12 to determine an appropriate dwell duration 107 for the fuel injector 12. The ECM 80 may then output spill valve commands 83 based on the appropriate dwell duration 107 determined for the fuel injector 12.

In some instances, the pressure 106 of a fuel injector 12 tested for during a series of tests performed on the fuel injector 12 is a peak injection pressure (PIP; as described above), and the pressure-dwell relationship map 86 generated for the fuel injector 12 is a peak injection pressure (PIP) map 87. In some instances, the pressure 106 of the fuel injector 12 tested for during a series of tests (e.g., EOL tests, tests performed at startup, shutdown, or during steady-state operation) is a start-of-injection pressure (SOIP; as described above), and the pressure-dwell relationship map 86 generated for the fuel injector 12 is a start-of-injection pressure (SOIP) map 88. However, a pressure-dwell relationship map 86 generated for a fuel injector 12 may represent the relationship between dwell duration 107 and any pressure related to the fuel injector 12. A pressure-dwell relationship map 86 may be generated for a particular set of engine conditions. For example, a pressure-dwell relationship map 86 may be generated for a particular engine speed or a particular range of engine speeds. Thus, for the operation of a fuel injector 12, a plurality of pressure-dwell relationship maps 86 may be generated for the fuel injector 12 for a respective plurality of engine conditions.

In some instances, a spill valve arrival time (VAT) may be determined during one or more tests (e.g., EOL tests). A spill VAT is the amount of time that it takes for a spill valve 20 of a fuel injector 12 to reach a closed position, measured from the time at which the electrical energy 102 applied to the spill valve solenoid 21 of the fuel injector 12 was increased to move the spill valve 20 to the closed position. In the example depicted in FIG. 5, for each of the tests 202A-202C, the electrical energy 102 applied to the spill valve solenoid 21 of the fuel injector 12 is increased to move the spill valve 20 to a closed position at time to, and the spill valve 20 reaches the closed position at time $t_7$. Thus, in this example, the spill VAT is the amount of time elapsed between time $t_6$ and time $t_7$.

In some instances, the electrical energy 102 applied to the spill valve solenoid 21 of the fuel injector 12 is reduced to move the spill valve 20 of the fuel injector 12 to a partially-open position only after the spill VAT. In some instances, as depicted in FIG. 4, after the spill VAT, the electrical energy 102 applied to the spill valve solenoid 21 of the fuel injector 12 may be reduced to an intermediate level before being reduced to a lower level to move a spill valve 20 of the fuel injector 12 to a partially-open position. This may be because it may require less electrical energy 102 to keep the spill valve 20 of the fuel injector 12 in the closed position than it does to initially move the spill valve 20 of the fuel injector 12 to the closed position. An intermediate level to which the electrical energy 102 applied to the spill valve solenoid 21 of the fuel injector 12 is reduced that keeps the spill valve 20 of the fuel injector 12 in the closed position may be referred to as a keep-in energy. For example, as depicted in FIG. 5, after the spill VAT, the electrical energy 102 applied to the spill valve solenoid 21 of the fuel injector 12 is reduced to a keep-in energy, and the spill valve 20 remains in the closed position, as indicated by the displacement 204 of the spill valve member 25 remaining at its maximum. The spill valve 20 does not move to a partially-open position until the electrical energy 102 applied to the spill valve solenoid 21 of the fuel injector 12 is reduced to a level below the keep-in energy (e.g., by terminating a portion of the electrical energy 102 applied to the spill valve solenoid 21 of the fuel injector 12 by a power source).

FIG. 6 depicts a flowchart of a method 500 for controlling a fuel injector of an engine system, which may include fuel injection system 10. Method 500 may be performed repeatedly during the operation of an engine system to adjust commands (e.g., spill valve commands 83) generated and/or outputted by controller (e.g., ECM 80) to compensate for changing engine conditions 85.

As depicted in FIG. 6, method 500 may begin with a step 502, in which electrical energy 102 (e.g., current) is applied to a spill valve solenoid 21 of a fuel injector 12 to move a spill valve 20 of the fuel injector 12 to a closed position. For example, as described above, fuel may not be released from a fuel injector 12 until enough electrical energy 102 is applied to a spill valve solenoid of the fuel injector 12 to move a spill valve 20 of the fuel injector 12 to a closed position. While the spill valve 20 is in the closed position, pressure within the fuel injector 12 increases, such that pressurized fuel may be released in a shot of fuel from the fuel injector 12 when a control valve 30 of the fuel injector 12 is moved to an injection position. As described above, electrical energy 102 may be applied to the spill valve solenoid 21 of a fuel injector 12 from a power source (e.g., a battery). An ECM 80 may apply electrical energy 102 to a spill valve solenoid 21 of a fuel injector 12 (or cause a power source to apply electrical energy 102 to the spill valve solenoid 21) by generating and/or outputting an appropriate spill valve command 83, as described above.

As depicted in FIG. 6, after electrical energy 102 (e.g., a current) is applied to the spill valve solenoid 21 of the fuel injector 12 to move the spill valve 20 of the fuel injector 12 to the closed spill position, method 500 may continue with a step 504, in which the electrical energy 102 applied to the spill valve solenoid 21 of the fuel injector 12 is reduced to move the spill valve 20 of the fuel injector 12 to an at least partially-open spill position. For example, as described above, in some instances, a spill valve 20 of a fuel injector 12 may be moved, or allowed to move, to a partially-open spill position between multiple shots of fuel released from the fuel injector 12 in order to reduce the pressure 106 of the fuel injector 12. In some instances, the electrical energy 102 applied to the spill valve solenoid 21 of the fuel injector 12 may be drawn down or otherwise reduced. An ECM 80 may reduce the electrical energy 102 applied to a spill valve solenoid 21 of a fuel injector 12 (or cause a power source to reduce the electrical energy 102 applied to the spill valve solenoid 21) by generating and/or outputting an appropriate spill valve command 83, as described above.

As depicted in FIG. 6, after the electrical energy 102 applied to the spill valve solenoid 21 of the fuel injector 12 is reduced to move the spill valve 20 of the fuel injector to the partially-open position, the method 500 may continue with a step 506, in which a dwell duration 107 is determined based on an expected pressure 106 of the fuel injector 12. For example, as described above, an ECM 80 may include or otherwise have access to one or more pressure-dwell relationship maps 86 generated for a fuel injector 12. As described above, a pressure-dwell relationship map 86 generated for a fuel injector 12 may represent a relationship between dwell duration 107 and pressure 106 of the fuel injector 12. As described above, a dwell duration 107 may be an amount of time elapsed between 1) the time at which the electrical energy 102 applied to the spill valve solenoid 21 of the fuel injector 12 is reduced to move the spill valve 20 of the fuel injector 12 to the partially-open spill position and 2) the time at which the electrical energy 102 applied to the spill valve solenoid 21 is increased to move the spill valve 20 back to the closed spill position. In general, the longer the dwell duration 107, the lower the pressure 106 of fuel within the fuel injector 12. Thus, for example, given a target pressure 106 of the fuel injector 12 (e.g., a target injection pressure), or a pressure limit for the fuel injector 12, the ECM 80 can retrieve a pressure-dwell relationship map 86 generated for the fuel injector 12 and determine or select a dwell duration 107 that will produce an expected pressure closest to the target pressure 106 of the injector, or closest to the pressure limit for the fuel injector 12 without exceeding the pressure limit for the fuel injector 12. In some instances, an ECM 80 includes or otherwise has access to a plurality of pressure-dwell relationship maps 86 generated for a plurality of fuel injectors 12 included in an engine system, and the ECM 80 can select the pressure-dwell relationship map 86 generated for the fuel injector 12 from the plurality of pressure-dwell relationship maps 86 generated for the plurality of fuel injectors 12.

As depicted in FIG. 6, after determining a dwell duration 107 based on an expected pressure 106 of the fuel injector 12, the method 500 may continue with a step 508, in which, after the dwell duration 107, the electrical energy 102 applied to the spill valve solenoid 21 of the fuel injector 12 is increased to return the spill valve 20 of the fuel injector 12 to the closed position. For example, as described above, the spill valve 20 of the fuel injector 12 may be returned to the closed position so that a second shot of fuel may be released from the fuel injector 12. In some instances, the electrical energy 102 applied to the spill valve solenoid 21 of the fuel injector 12 is increased to return the spill valve 20 of the fuel injector 12 to the closed position immediately after the dwell duration 107. In some instances, the electrical energy 102 applied to the spill valve solenoid 21 of the fuel injector 12 is reduced to allow the spill valve 20 of the fuel injector 12 to return to its resting, fully-open position only after multiple shots of fuel have been released from the fuel injector 12. An ECM 80 may increase the electrical energy 102 applied to a spill valve solenoid 21 of a fuel injector 12 (or cause a power source to increase the electrical energy 102 applied to the spill valve solenoid 21) by generating and/or outputting an appropriate spill valve command 83, as described above.

Although the methods and systems disclosed herein are often described in relation to a fuel injector 12 that includes a plurality of valves (e.g., a spill valve 20, a control valve 30, and a check valve), it will be understood that the methods and systems disclosed herein may also be applied to any type of valve included in a fuel injector and/or to a fuel injector that includes any number of valves. For example, a fuel injector may include only a single valve that performs the function or a similar function of a control valve as described herein, and a pressure-dwell relationship map 86 may generated and used for the single valve included in the fuel injector. Or for example, a fuel injector may include only a single valve that performs both functions or similar functions of a spill valve and a control valve as described herein, and a pressure-dwell relationship maps 86 may be generated and used for the single valve included in the fuel injector. Or for example, a fuel injector may include three or more valves, and three or more respective pressure-dwell relationship maps 86 may be generated and used for the three or more valves.

Using a pressure-dwell relationship map 86 generated for a fuel injector 12, an ECM 80 may control or reduce the pressure within the fuel injector 12. Controlling or reducing the pressure within a fuel injector 12 may allow an engine system that includes the fuel injector 12 to operate with less risk of wear or damage. Controlling or reducing the pressure within a fuel injector 12 may also allow an engine system that includes the fuel injector 12 to operate more efficiently and produce less smoke, such as by maximizing the pressure within the fuel injector 12 without exceeding a pressure limit of the fuel injector 12. By generating and using pressure-dwell relationship maps 86 for a plurality of fuel injectors 12 included in an engine system, the engine system can improve its efficiency by controlling the pressure of the fuel injectors 12 included in the engine system on an injector-by-injector basis.

It will be apparent to those skilled in the art that various modifications and variations can be made to the disclosed method and system without departing from the scope of the disclosure. Other embodiments of the method and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. A method for controlling a fuel injector of an engine system, the method comprising:
applying a first current to a spill valve solenoid to move a spill valve of the fuel injector to a closed spill position;
reducing the first current applied to the spill valve solenoid to move the spill valve to an at least partially-open position;
determining a dwell duration for the fuel injector based on an expected fuel pressure of the fuel injector; and
after the determined dwell duration, increasing the first current applied to the spill valve solenoid to return the spill valve to the closed spill position.

2. The method of claim 1, wherein the dwell duration begins when the first current is applied to the spill valve solenoid is reduced to move the spill valve to the partially-open position and ends when the first current applied to the spill valve solenoid is increased to return the spill valve to the closed position immediately after the dwell duration.

3. The method of claim 1, wherein the fuel injector further comprises a control valve and further comprising:
after applying the first current to the spill valve solenoid to move the spill valve to the closed position, applying a second current to a control valve solenoid to move the control valve to an injection position;
reducing the second current applied to the control valve solenoid to return the control valve to a non-injection position;
after the first current applied to the spill valve solenoid is increased to return the spill valve to the closed position, increasing the second current applied to the control valve solenoid to return the control valve to the injection position; and
reducing the first current applied to the spill valve solenoid to move the spill valve to a fully-open position only after the second current applied to the control valve solenoid is increased to return the control valve to the injection position.

4. The method of claim 1, wherein the expected fuel pressure of the fuel injector is determined based on a pressure-dwell relationship map for the fuel injector.

5. The method of claim 4, wherein the engine system includes a plurality of fuel injectors including the fuel injector and the method further comprises selecting the at least one pressure-dwell relationship map generated for the fuel injector from a plurality of pressure-dwell relationship maps for the plurality of fuel injectors.

6. The method of claim 4, wherein the expected fuel pressure includes a peak injection pressure and wherein the pressure-dwell relationship map includes a peak injection pressure map.

7. The method of claim 4, wherein the expected fuel pressure includes a start-of-injection pressure and wherein the pressure-dwell relationship map includes a start-of-injection pressure map.

8. The method of claim 4, wherein the at least one pressure-dwell relationship map includes a peak injection pressure map and a start-of-injection pressure map.

9. The method of claim 4, wherein the at least one pressure-dwell relationship map was generated using a series of end-of-line (EOL) tests.

10. The method of claim 1, wherein the spill valve is not allowed to move to a fully-open position during the dwell duration.

11. A method for generating at least one pressure-dwell relationship map for a fuel injector, the method comprising:
performing a series of tests on the fuel injector, wherein each test of the series of tests includes:
applying a first current to a spill valve solenoid to move a spill valve of the fuel injector to a closed position;
reducing the first current applied to the spill valve solenoid to move the spill valve to a partially-open position for a dwell duration; and
measuring at least one fuel pressure of the fuel injector after expiration of the dwell duration; and
generating, based on the series of tests performed on the fuel injector, at least one pressure-dwell relationship map for the fuel injector.

12. The method of claim 11, further comprising determining, based on the series of tests performed on the fuel injector, a spill valve arrival time for the fuel injector.

13. The method of claim 12, wherein the first current applied to the spill valve solenoid is reduced to move the spill valve to the partially-open position for the dwell duration after the spill valve arrival time.

14. The method of claim 11, wherein the at least one fuel pressure includes a peak injection pressure and wherein the at least one pressure-dwell relationship map includes a peak injection pressure map.

15. The method of claim 11, wherein the at least one fuel pressure includes a start-of-injection pressure and wherein the at least one pressure-dwell relationship map includes a start-of-injection pressure map.

16. An engine system including at least one fuel injector and a controller operative to:
apply a first current to a valve solenoid to move a valve of the fuel injector to a fully closed position;
reduce the first current applied to the valve solenoid to move the valve to a partially-open position;
determine a dwell duration for the valve of the fuel injector based on at least one expected fuel pressure of the fuel injector; and
after determining the dwell duration, increase the first current applied to the valve solenoid to return the valve to the fully closed position.

17. The engine system of claim 16, wherein the dwell duration begins immediately after the first current applied to the valve solenoid is reduced to move the valve to the partially-open position and wherein the first current applied to the valve solenoid is increased to return the valve to the fully closed position immediately after the dwell duration.

18. The engine system of claim 16, wherein the valve is a spill valve having a spill valve solenoid and the fuel injector further comprises a control valve and wherein the controller is further operative to:
after applying the first current to the spill valve solenoid to move the spill valve to the fully closed position, apply a second current to a control valve solenoid to move the control valve to an open control position;
reduce the second current applied to the control valve solenoid to move the control valve to a closed control position;
after the first current applied to the spill valve solenoid is increased to return the spill valve to the fully closed position, increase the second current applied to the control valve solenoid to the return the control valve to the open control position; and
reduce the first current applied to the spill valve solenoid to allow the spill valve to return to a fully-open position only after the second current applied to the control valve solenoid is increased to return the control valve to the open control position.

19. The engine system of claim 16, wherein the at least one expected fuel pressure of the fuel injector is based on at least one pressure-dwell relationship map generated for the fuel injector.

20. The engine system of claim 17, further including a plurality of fuel injectors including the fuel injector and wherein the controller is further operative to select the at least one pressure-dwell relationship map generated for the fuel injector from a plurality of pressure-dwell relationship maps generated for the plurality of fuel injectors.

* * * * *